Feb. 10, 1953 M. L. WOOD 2,628,310
COUNTER CIRCUITS
Filed Dec. 31, 1951 5 Sheets-Sheet 1

INVENTOR
MARION L. WOOD
BY
Joseph C. Sweet, Jr.
ATTORNEY

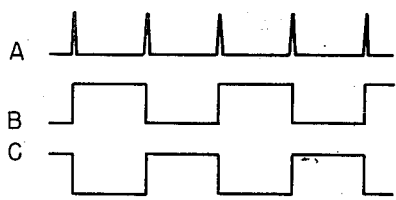
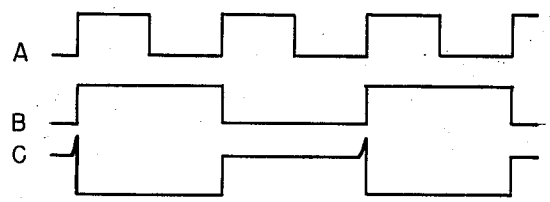
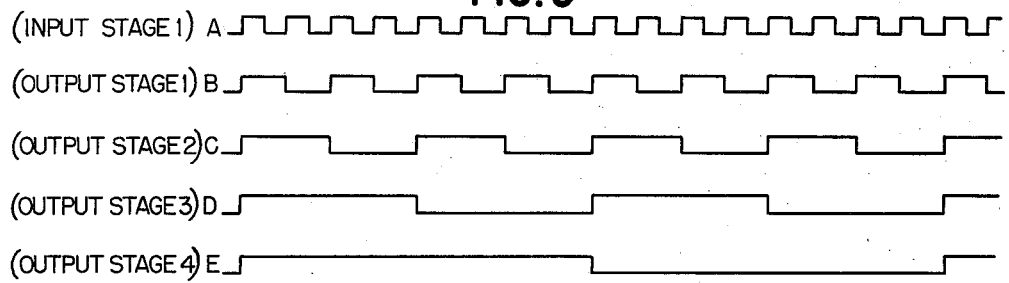
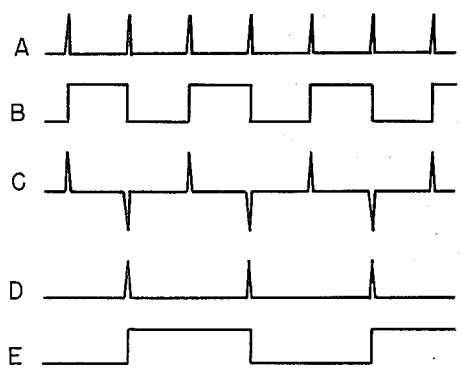
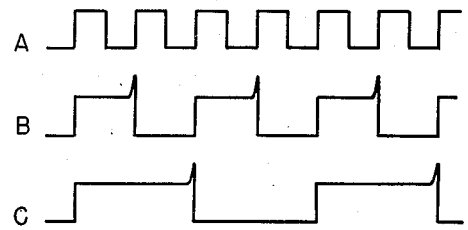
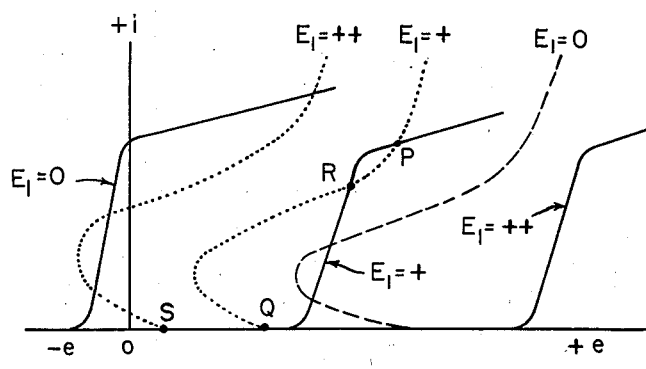

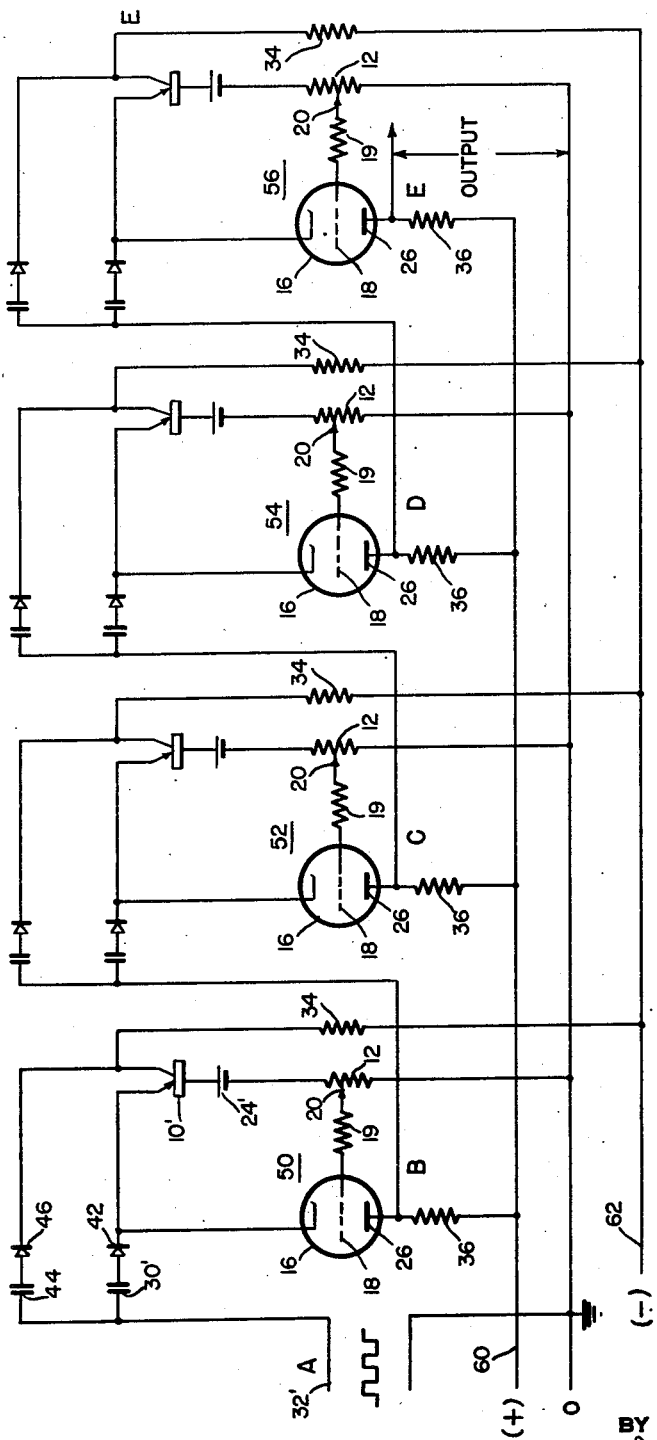

Feb. 10, 1953  M. L. WOOD  2,628,310
COUNTER CIRCUITS
Filed Dec. 31, 1951  5 Sheets-Sheet 4

INVENTOR
MARION L WOOD
BY Joseph C. Sweet, Jr.
ATTORNEY

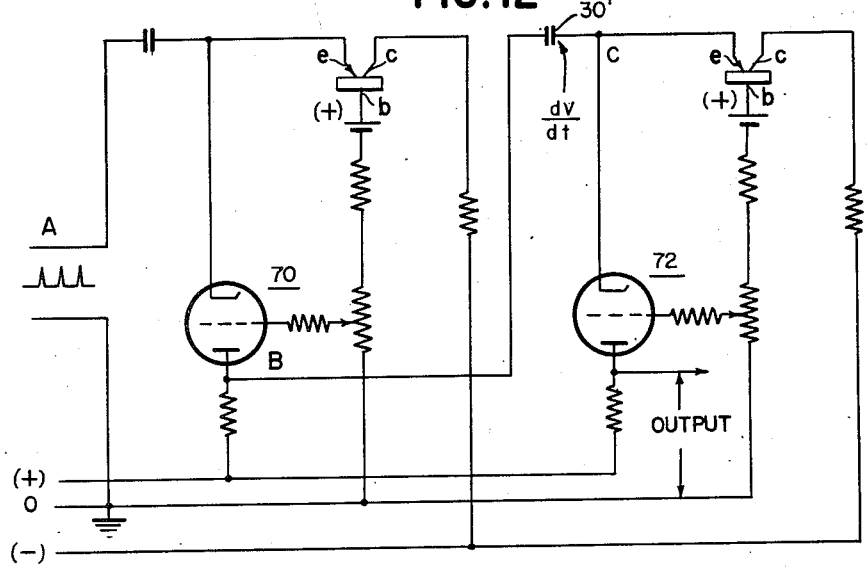
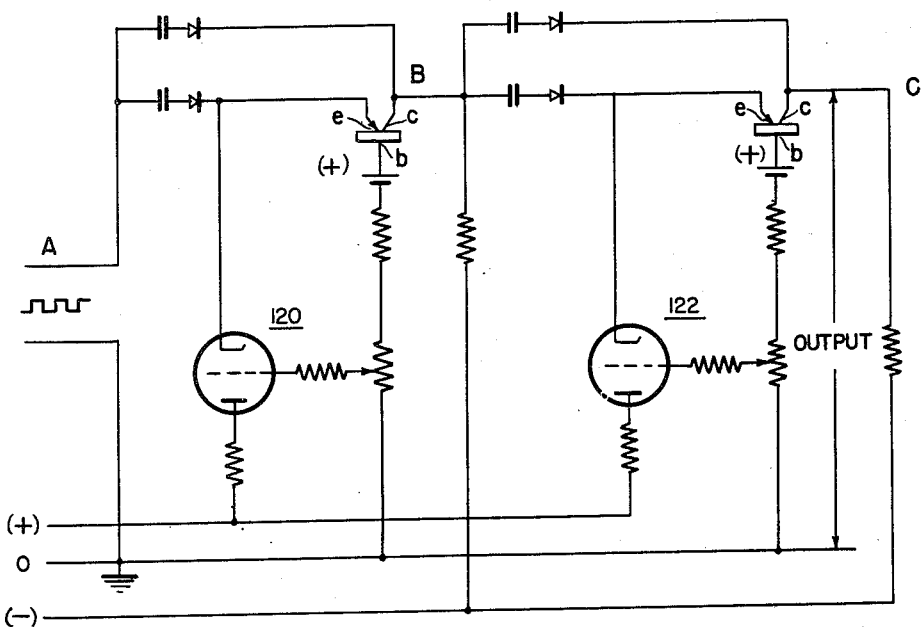

Patented Feb. 10, 1953

2,628,310

UNITED STATES PATENT OFFICE 2,628,310

COUNTER CIRCUITS

Marion L. Wood, Highland, N. Y., assignor to International Business Machines Corporation, New York, N. Y., a corporation of New York Application December 31, 1951, Serial No. 264,342

20 Claims. (Cl. 250—27)

This invention relates to electronic counter circuits, and more particularly to pulse counter circuits employing a transistor-tube combination and having two stable states of operation alternately assumed.

The transistor was initially described in an article by Bardeen and Brattain in Physical Review, vol. 74, pp. 230–231, July 15, 1948. It has since been described in greater detail in an article by the same authors in Physical Review, vol. 75, pp. 1208–1225, April 15, 1949.

Since that time various forms of transistors have been produced, including the coaxial transistor, the junction transistor and the fieldistor. These are described in the following articles:

Kock and Wallace "Coaxial Transistors," Electrical Engineering, vol. 68, pp. 222–223, March 1949;

Shockley et al., "p-n Junction Transistors," Physical Review, vol. 83, pp. 151–162, July 1, 1951;

Stuetzer "A Crystal Amplifier with High Input Impedance," Proceedings of the I. R. E., vol. 38, pp. 868–871, August 1950.

Briefly, the basic transistor comprises a small block of semi-conductor material to which are applied at least three electrodes, termed base, collector, and emitter, respectively. The semi-conductor material may be either of n-type (indicating that the charges in the material normally available for carrying current are negative, i. e., electrons) or p-type (indicating that the charges in the material normally available for carrying current are positive, i. e., "holes"). It has been found that silicon and germanium, and particularly the latter, are suitable semi-conductor materials. In the original point contact, or "Type A" transistor, and the fieldistor the body block is composed of only one type of semi-conductor material before surface treatment, and in the case of germanium the type usually employed is n-type. In the case of the junction transistor, the body block is composed of three or more layers of alternately n- and p-type semi-conductor material (usually germanium) and the contacts are of the ohmic type, rather than being point contacts. When potentials are properly applied between the base and each of the other two electrodes, a translating device is produced wherein variations in current in the collector-base or output circuit are produced by variations in current in the emitter-base or input circuit.

The theory and operation of the transistor are described in detail in the above articles.

Pulse counter circuits employing transistors have been developed in the art to replace pulse counter circuits employing vacuum or gas tubes. These transistor pulse counter circuits have the advantage that they require no heater or filament power, develop considerably less heat, and do not require as high operating potentials as prior counter circuits. However, the stability of the transistor trigger circuits leaves much to be desired in that adjustments are usually required each time a transistor counter has its transistor replaced and, which is even more of a disadvantage, even when it is energized again after a period of deenergization, regardless of the length of the latter.

Accordingly, a principal feature of this invention is the provision of a pulse counter circuit having improved stability and employing a discharge device or tube in combination with a transistor to produce a pulse counter circuit having two stable states of operation alternately assumed.

Other features of the invention will be pointed out in the following description and claims and illustrated in the accompanying drawings, which disclose, by way of example, the principle of the invention and the best mode, which has been contemplated, of applying that principle.

In the drawings:

Fig. 4 shows separately the respective input characteristics of the transistor circuit and tube circuit utilized;

Figs. 6 and 7 illustrate the input and output waveforms of the scalers of Figs. 5A and 5B, respectively;

Fig. 8 is a circuit diagram of a four stage binary counter utilizing individual scalers in accordance with Fig. 5B;

Fig. 9 illustrates waveforms at various points in the circuit of Fig. 8, including the input and output thereof;

Figs. 10 and 12 show two stage binary counters, each utilizing individual scalers in accordance with Fig. 5A.

Fig. 11 shows waveforms at various points in the circuit of Fig. 10, including the input and output thereof;

Fig. 13 is a two stage binary counter utilizing individual scalers in accordance with Fig. 5B; and Fig. 14 shows the waveforms at various points in the circuit of Fig. 13 including the input and output thereof.

Figure 1:
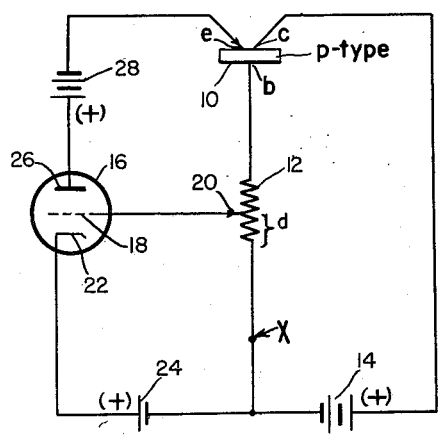
Fig. 1 is the basic circuit diagram of one embodiment of this invention utilizing a p-type transistor.

As shown in Fig. 1, a transistor 10 having a body of p-type semi-conducting material has the resistance element of potentiometer 12 and bias battery 14 connected in series in the order named between its base b and collector c. Because transistor 10 utilizes a body of p-type material, the positive terminal of bias battery 14 is connected to collector c. Electron discharge device or tube 16 has its grid 18 connected to tap 20 on potentiometer 12, its cathode 22 connected through bias battery 24 to the junction of potentiometer 12 and bias battery 14, and its plate 26 connected to emitter e of transistor 10 through bias battery 28. The positive terminal of battery 28 is connected to plate 26 and the positive terminal of battery 24 is connected to cathode 22, and the voltage produced across resistance 12 plus that of battery 28 add to provide a potential of greater magnitude than that of battery 24 in order to bias tube 16 properly for conduction when its control grid 18 is biased above cut-off. This arrangement also biases emitter e of transistor 10 properly i. e., negatively with respect to base b.

Alternatively battery 24 may be inserted in the base circuit of the transistor at point X, thereby allowing a smaller battery 14 to be used since at that point the potential of battery 24 will add to that of battery 14. Further, battery 28 may be omitted from the circuit, if desired, since the voltage developed across base resistance 12 during the operation of the circuit is of the proper polarity to bias plate 26 and emitter e for conduction and can be made of adequate magnitude by suitable choice of the ohmic value of resistance 12. However, it is believed that the inclusion of battery 28 renders the circuit more stable.

Only the basic circuit is shown in Fig. 1 (as well as in Figs. 2 and 3), the input and output connections and the output or load impedances being omitted from these figures. Suitable input and output connections and load impedances are shown in the other figures, e. g., Figs. 5A and 5B.

Transistor 10 has a current amplification alpha ($\alpha$) greater than one; i. e., an increase in emitter current produces an increase in collector current that is greater than in magnitude than the incease in emitter current, the collecor potential being held constant. Since resistance 12 is common to the emitter and collector circuits, this increased collector current will, of course, flow through this resistance.

Assuming that both transistor 10 and tube 16 are initially conducting, i. e., that the circuit of Fig. 1 is in its first stable state of operation, tap 20 on potentiometer 12 is adjusted such that the grid-to-cathode potential of the tube is approximately zero. In other words, the voltage drop across the portion d of potentiometer 12 between its lower end and tap 20 is approximately equal to the potential of bias battery 24 for the condition of maximum or saturation current flow through the transistor 10. If now the potential of emitter e is varied momentarily so as to decrease the emitter current flow, as by the application of a trigger pulse of proper polarity, the collector current will correspondingly decrease, thereby reducing the current through potentiometer 12 and causing the control grid 18 to drop in potential. By proper choice of circuit parameters, the potential of control grid 18 relative to cathode 22 will assume a value such that tube 16 is cut off. The circiut of Fig. 1 is thus in its second stable state of operation, with tube 16 cut off, thereby preventing further flow of emitter current, and with only minimum current flowing in the collector circuit of the transistor.

If now the potential of emitter e of transistor 10 is momentarily varied in the opposite direction, emitter current will again flow, causing a corresponding increased flow of collector current. The increased collector current causes an increase in the voltage produced across potentiometer 12, thereby again raising the potential of grid 18 relative to cathode 22 above the cut-off potential for tube 16. Tube 16 will thus again begin to conduct current, further increasing the flow of emitter current through transistor 10 until saturation is reached.

While the above explanation of the operation of the embodiment of Fig. 1 has been in terms of varying the potential of emitter e of transistor 10, it is, of course, apparent that the circuit can be switched between its two stable states of operation by the application of trigger pulses to other points in the circuit. For example, trigger pulses may be applied to grid 18 of tube 16 to achieve precisely the same result. It is, of course, also apparent that instead of applying pulses of opposite polarities to a single element, pulses of the same polarity may be applied alternately to different elements to trigger the circuit between its two stable states of operation, e. g., to the grid 18 and cathode 22 of tube 16. Further, successive pulses of the same polarity may be applied to plate 26 and emitter e simultaneously to switch the circuit back and forth between its two stable states of operation. Thus the circuit of Fig. 1 may be triggered by either negative pulses, or positive pulses, or a combination of both applied to the junction of emitter e and plate 26. However, by proper choice of circuit parameters, the circuit may be made selective so as to trigger from pulses of one polarity, but not the other, when pulses of both polarities are applied in succession to this junction.

Figure 2:
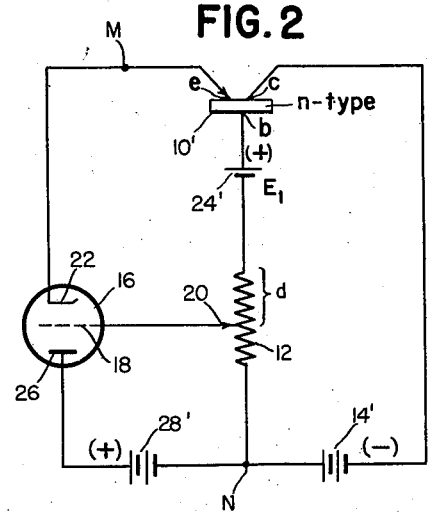
Figs. 2 and 3 are basic circuit diagrams of second and third embodiments of this invention, each utilizing an n-type transistor.

In Fig. 2 is shown the basic circuit of a second embodiment of this invention, the major difference being that transistor 10' here utilizes a body of n-type semi-conducting material. In order to bias transistor 10 properly, battery 14' is connected between potentiometer 12 and collector c of transistor 10' with its negative terminal connected to the latter, and the negative terminal of battery 28' is connected to the junction of potentiometer 12 and battery 14'. Emitter e of transistor 10' is connected directly to cathode 22 of tube 16, and control grid 18 is again connected to tap 20 on potentiometer 12.

The operation of the circuit of Fig. 2 is similar to that of the circuit of Fig. 1, tap 20 on potentiometer 12 again being adjusted so that the grid-to-cathode potential of tube 16 is approximately zero when the circuit is in its first stable state of operation, with both tube 16 and transistor 10' conducting. If now a trigger pulse of positive polarity is applied to cathode 22, the potential difference between cathode 22 and grid 18 is increased and, if the pulses are of sufficient magnitude, made greater than the cut-off value for the tube. Current therefore ceases to flow through tube 16 and the emitter circuit, causing a corresponding decrease in current in the collector circuit and a corresponding reduction in the voltage across potentiometer 12. The resultant voltage across portion $d$ of potentiometer 12 is no longer large enough to overcome the potential $E_1$ of bias battery 24', and grid 18 of tube 16 therefore remains biased beyond cut-off even after the trigger pulse ends.

The positive trigger pulse applied to cathode 22 was, of course, also applied to emitter $e$, inasmuch as the two are connected together, but had negligible effect on the latter since the transistor was already conducting maximum current.

If now, with the circuit in its second stable state of operation, a positive pulse is applied to emitter $e$, emitter current will again flow, producing a corresponding increase in the flow of collector current and hence increasing the potential developed across potentiometer 12. The resultant voltage across portion $d$ of potentiometer 12 is now large enough to overcome the negative voltage $E_1$ of battery 24', so that control grid 18 of tube 16 is now biased above its cut-off value, thus causing tube 16 to conduct and further increasing the flow of emitter current. The flow of collector current will thereby increase to its maximum value, placing the circuit of Fig. 2 again in its first stable state of operation.

Although the positive pulse was also applied to cathode 22, it of course had negligible effect on that control element inasmuch as tube 16 was already cut off.

Application of a further positive pulse to emitter $e$ will now drive the circuit back into its second state of operation in the manner described above, etc., the circuit thus switching between its two stable states of operation in response to each applied trigger pulse.

While the above explanation of the operation of the circuit of Fig. 2 has been in terms of the application of only positive pulses to the junction of cathode 22 and emitter $e$ to trigger the circuit between its two stable states of operation, by proper choice of circuit parameters the circuit will also switch back and forth in response to successive negative pulses, or to a combination of successive positive and negative pulses. Or, as explained above in connection with Fig. 1, the circuit can, by a different choice of circuit parameters, be made selective so as to trigger in response to pulses of only one polarity when pulses of both polarities are applied in succession.

Figure 3:
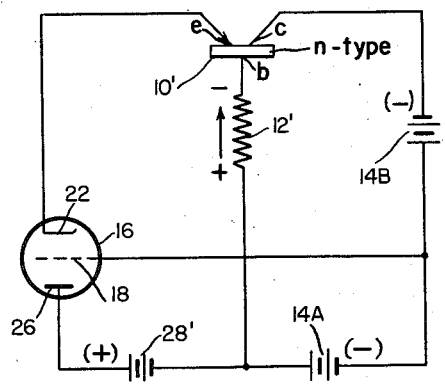

In Fig. 3 is shown still a third embodiment of this invention, generally similar to the embodiment of Fig. 2 except that battery 14' of the latter figure is split into two portions 14A and 14B and control grid 18 of tube 16 is connected to the junction of these two batteries. Potentiometer 12 is accordingly replaced by resistance 12' and battery 24' is omitted.

The operation of the circuit of Fig. 3 is similar to that of the circuit of Fig. 2, the difference being that the entire potential drop across resistance 12' is now available to oppose the fixed bias potential, now produced by battery 14A, during the operation of the circuit rather than merely that developed across the portion $d$ of potentiometer 12 in Fig. 2.

The operation of the basic circuits of Figs. 1–3 may be clearer if reference is made to Fig. 4, which shows separately the respective input characteristics of the transistor and tube portions of these figures. Consider for example, the input characteristics of the tube portion of Fig. 2, i. e., the characteristics of tube 16 looking in from points M and N, for various values of bias battery 24'; and similarly the input characteristics of the circuit of transistor 10' of Fig. 2, also looking in from points M and N, for various values of bias battery 24'. These input characteristics are shown in Fig. 4, voltage being plotted horizontally and current vertically, and the tube characteristics being shown in solid lines. The S-shaped tube characteristic at the left is for a value of bias battery 24' equal to zero and is accordingly labelled $E_1=0$. The right-hand S-shaped tube characteristic labelled $E_1=++$ shows the input characteristic of the tube circuit for a positive value of battery 24', the resultant negative biasing when the voltage across M—N equals zero being greater than cut-off value. The dashed line characteristic exhibiting a negative impedance region over a portion of its operating range shows the input characteristic of the transistor circuit for battery potential $E_1$ (produced by battery 24') equal to zero, and the similar dotted line characteristics to the left of this show the input characteristics of the transistor circuit for two positive values of $E_1$, the right-hand dotted characteristic being for potential $E_1$ equal to the value chosen for the desired operation of the circuit of Fig. 2.

One stable state of operation of the circuit of Fig. 2 is therefore indicated at point P, the intersection of the tube characteristic for $E_1=+$ and the dotted line transistor circuit characteristic for $E_1=+$. As the value of bias battery 24' is raised, the tube characteristic moves to the right as shown, the transistor characteristic moves to the left, and the circuit will switch to the state of operation indicated by point S at the intersection of the dotted line characteristic labelled $E_1=++$ and the tube characteristic labelled $E_1=++$. Reducing the value of battery 24' to $E_1=+$ will cause the circuit to assume operating point Q. Note that the two curves for $E_1=+$ also intersect at an intermediate point R. However, this point defines an unstable state of operation since the negative slope of the dotted curve is less than the positive slope of the solid curve at that point.

While in the above explanation tube 16 and transistor 10' have both been considered as non-conducting in one stable state of operation, i. e. operating point Q lies on the zero current axis, as shown in Fig. 4, this is not necessary. If desired, the circuit parameters may be adjusted such that the lower intersection of the transistor and tube input characteristic curves occurs at some finite current value. Such finite current value would, of course, be less than that at the uppermost intersection of the same characteristic curves.

In connection with Figs. 1–3 it is also to be noted that each circuit provides positive feedback in both the grid and plate circuits of tube 16. Referring to Fig. 3, for example, current flow through resistor 12' is upward on the drawing as indicated by the arrow, thus making the upper end of resistor 12' negative with respect to its lower end. Thus, any increase in voltage across resistor 12' due to increased collector current adds to the voltage applied between plate 26 and cathode 22 of tube 16. In other words, as more current flows through tube 16 to increase the emitter current of transistor 10', thus increasing the collector current, a larger voltage is produced across resistance 12', thereby raising the potential of plate 26 relative to cathode 22 and still further increasing the emitter current. The positive feedback circuit for the grid circuit between control grid 18 and cathode 22 can be traced similarly except that in this case the increased potential produced across resistor 12' due to increased collector current subtracts from that provided by grid battery 14A, thereby increasing still further the flow of current through tube 16 and the emitter circuit.

It will, of course, be apparent to those skilled in the art that the circuits of Figs. 1–3 might be rearranged so as to provide only one of the tube circuits with positive feedback. For example, grid 18 might have its potential relative to cathode 22 maintained constant by connecting a battery of fixed potential directly between cathode 22 and grid 18, the resultant circuit thus relying entirely upon the positive feedback in its plate circuit to produce the desired switching action. Similarly, tube 16 might be replaced by a gaseous discharge diode.

Figure 5A:
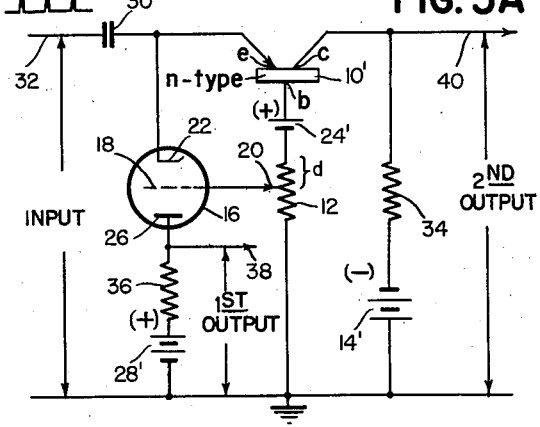
Figs. 5A and 5B are circuit diagrams of scalers utilizing the basic circuit of the embodiment of Fig. 2.

In Fig. 5A is shown a scaler in accordance with the circuit of Fig. 2, corresponding elements in the two figures being correspondingly numbered. An input of applied positive trigger pulses is connected to emitter $e$ through coupling condenser 30, the input being connected between line 32 and ground as shown. The junction point of potentiometer 12 and batteries 14' and 28' is also grounded. Two load impedances are provided in the form of resistors 34 and 36, connected between battery 14' and collector $c$, and battery 28' and plate 26, respectively. Thus, a first output is available at line 38, connected to plate 26, and a second output is available at line 40, connected to collector $c$.

The operation of the circuit of Fig. 5A has already been described above in connection with Fig. 2 and hence will not be repeated.

In one embodiment utilizing the circuit of Fig. 5A, transistor 10' was a "Type A" point contact transistor having a current amplification factor of 1.5, batteries 14' and 28' were each 45 volts, battery 24' was 67.5 volts, potentiometer 12 was 20,000 ohms, resistor 34 was 510 ohms, resistor 36 was 1,000 ohms, coupling condenser 30 was 0.05 microfarads, and tube 16 was one half of a type 5687 tube.

In Fig. 6 are shown the input and output waveforms of the circuit of Fig. 5A, the input positive trigger pulses of line A of Fig. 6 being applied at line 32 (Fig. 5A) to produce the output waveform shown in line B (available at line 38 of Fig. 5A) and the output waveform shown in line C (available at line 40 of Fig. 5A). Note that the outputs shown in lines B and C are of opposite polarities. The output waveform of line B is, of course, also available across potentiometer 12 of Fig. 5A and may be utilized, if desired, instead of or in conjunction with either of the outputs shown in Fig. 5A.

Figure 5B:
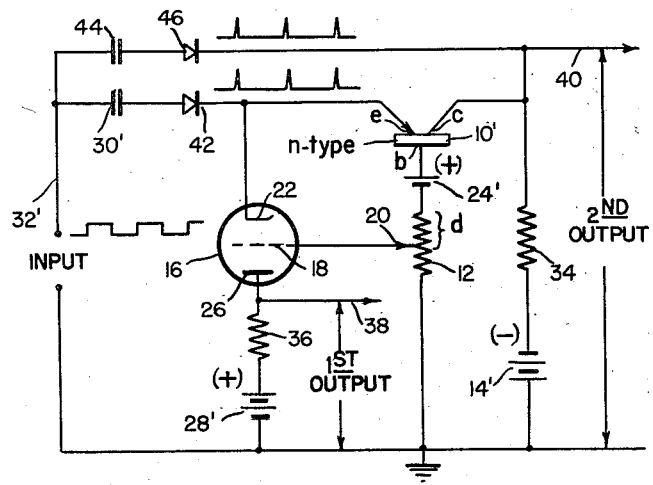

In Fig. 5B is shown a second scaler embodiment in accordance with the circuit of Fig. 2. Again, corresponding elements are correspondingly numbered. The first difference between the circuits of Figs. 5A and 5B is that a diode 42 is connected between condenser 30' and emitter $e$ and the value of condenser 30' is chosen small enough so that it functions as a differentiating element. Further, input line 32' is also connected through a second differentiating condenser 44 and a second diode 46 to collector $c$ of transistor 10'. As shown in line A of Fig. 7 (and indicated on Fig. 5B), input pulses in the form of square waves are applied between line 32' and ground. These square waves are differentiated by condensers 30' and 44 and the resulting negative polarity pulses are blocked by diodes 42 and 46, poled as shown, so that only positive polarity trigger pulses, each comprising simultaneously with the leading edge of a corresponding positive square wave portion of the input, are applied simultaneously to collector $c$ and emitter $e$ of transistor 10, as indicated in Fig. 5B.

Assuming that the circuit of Fig. 5B is initially in its first stable state of operation with no current flowing through tube 16 or emitter $e$ and only minimum current flowing through collector $c$, the first positive trigger pulse applied to collector $c$ has virtually no effect thereon because of the large potential drop across the body of the transistor between the base and collector electrodes. However, as described above in connection with Fig. 5A, this positive pulse applied to the emitter will cause emitter current to flow and a corresponding increased collector current to flow, thus increasing the IR voltage drop across potentiometer 12 and raising grid 18 above cut-off. The circuit of Fig. 5B will thus rapidly attain its second stable state of operation, with maximum or saturation current flow through the collector circuit and maximum or saturation current flowing through the emitter and tube 16 in series. The next positive trigger pulse applied simultaneously to emitter $e$, cathode 22, and collector $c$ will switch the circuit of Fig. 5B back to its first stable state of operation for two reasons. First, the cathode potential is raised as described above in connection with Fig. 5A, thus making the grid-to-cathode potential of tube 16 greater than its cut-off valve. Secondly, since the collector-to-base potential of transistor 10' is now relatively low, of the order of 2 to 5 volts, the trigger pulse applied to collector $c$ makes the latter relatively much more positive with respect to base $b$, thereby tending to decrease the collector current. The resultant reduction in collector current then further reduces the potential drop across resistance 12, thereby driving grid 18 further toward or beyond its cut-off value until the first stable state of operation of the circuit of Fig. 5B is again reached.

The output waveform of line B of Fig. 7 is available at line 38 of Fig. 5B and the output waveform of line C of Fig. 7 is available at line 40. Note again that the output waveforms of lines B and C of Fig. 7 are of opposite polarity, and also that the waveform of line C is somewhat peaked at the trailing edge of each positive square wave portion thereof because of the positive differentiated pulse applied to collector $c$ at this instant. As in Fig. 5A, the output waveform of line B of Fig. 7 is also available across potentiometer 12 (Fig. 5B), and the output at this point may be utilized either alone or in conjunction with the outputs of lines 38 and 40 of Fig. 5B.

In one embodiment utilizing the circuit of Fig. 5B, condenser 30' was 0.006 microfarad, condenser 44 was 0.02 microfarad, diodes 42 and 46 were both type 1N48, and the remainder of the circuit values were as given above in connection with Fig. 5A.

In Fig. 8 is shown a four-stage (1—2—4—8) binary counter comprising four stages 50, 52, 54 and 56, each similar to the single stage scaler shown in Fig. 5B and utilizing the labeled "1st output" thereof. A single source of positive potential is utilized and connected via line 60 to the plate 26 of each tube 16, resistor 36 associated with each tube 16 thus serving as both an isolating resistor and a load impedance. Similarly, a single source of negative potential is provided and connected through line 62 to the collector $c$ of each stage through isolating resistor 34, which could, of course, if desired also function as a load impedance. Grid 18 of each tube 16 is connected to its respective tap 20 on the associated potentiometer 12 through grid resistor 19, which may be of a small value, e. g., 100 ohms. This resistor is not necessary to the functioning of the trigger circuit, but if included prevents the flow of excessive grid current in tube 16 when the tube is conducting and also inhibits any tendency of the tube toward self-oscillation. The wave forms at the various points in the circuit of Fig. 8 are shown in Fig. 9 and labeled lines A—E inclusive. The various points in the circuit of Fig. 8 at which these wave forms appear are indicated by the respective capital letters. The operation of each of the stages of Fig. 8 is similar to that of the individual scaler stage of Fig. 5B and hence will not be repeated here.

Figure 10:
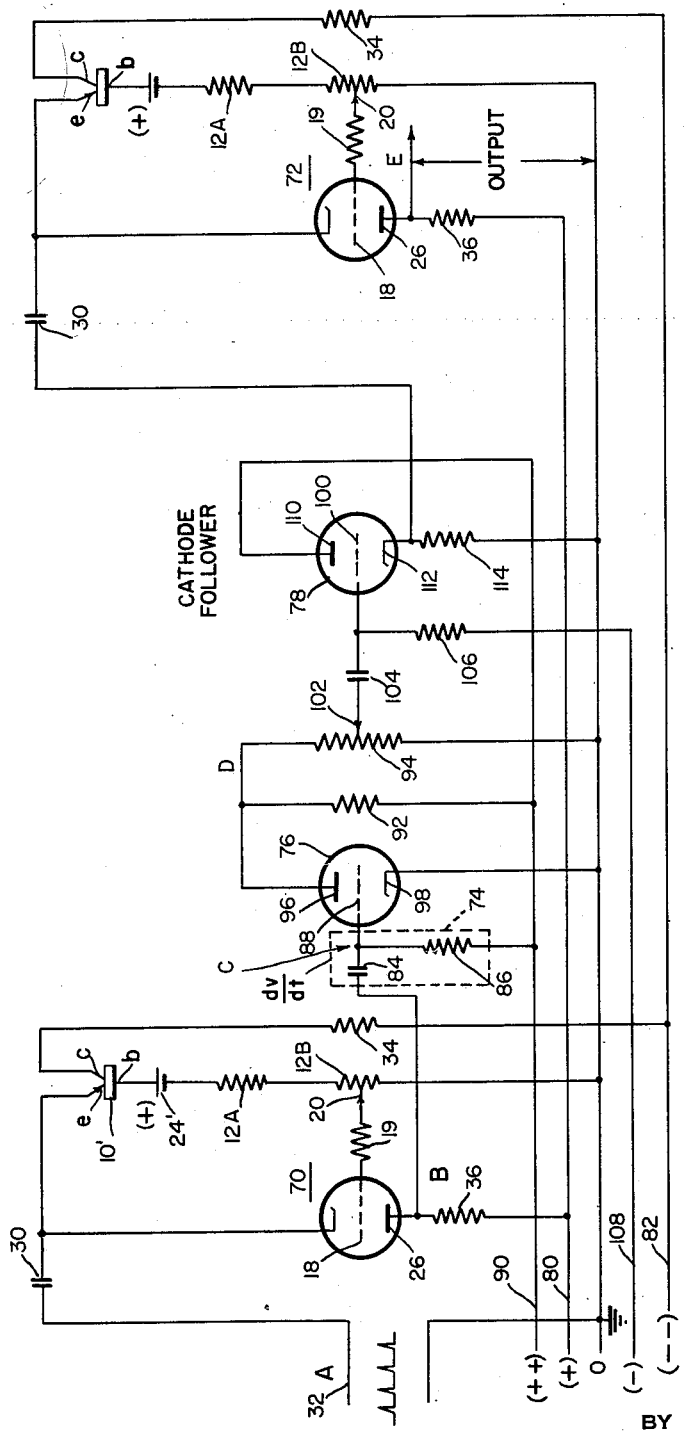

In Fig. 10 is shown a two-stage (1—2) binary counter comprising two stages 70 and 72 connected together through a differentiating circuit 74, positively biased inverter-amplifier 76 and cathode follower 78. Each of stages 70 and 72 is similar to the scaler circuit of Fig. 5A except that base potentiometer 12 of Fig. 5A has been replaced by a fixed resistance 12A and a smaller potentiometer 12B, and a grid resistor 19 is included between grid 18 and tap 20, as in Fig. 8. Also, a single source of positive potential is utilized and connected via line 80 to the plate 26 of each stage through its respective resistor 36, which thus serves as both an isolating resistor and a load impedance. Similarly, a single source of negative potential is utilized for both stages and connected via line 82 to the collector c of each stage through its respective isolating resistor 34. The output of first stage 70, taken from plate 26, is connected through differentiating circuit 74, comprising condenser 84 and resistor 86, to grid 88 of inverter-amplifier tube 76. The free end of differentiating resistor 86 is connected via line 90 to a second and higher source of positive potential. Resistor 92 and the resistance element of potentiometer 94 are connected in series in the order named as a potential divider between line 90 and ground, and their junction is connected to plate 96 of tube 76. Cathode 98 of tube 76 is grounded. Grid 100 of cathode follower tube 78 is connected to tap 102 of potentiometer 94 through coupling condenser 104 and through grid resistor 106 and line 108 to a second and more negative source of negative potential. Plate 110 of tube 78 is connected to positive potential line 90 and its cathode 112 is connected to ground through cathode resistor 114. Cathode 112 is then connected to the input of the second stage 72 through coupling condenser 30.

The wave forms at the various points in the circuit of Fig. 10 are shown in Fig. 11 and labeled lines A—E, inclusive. The regularly repeated input trigger pulses shown in line A of Fig. 11 are applied to the input (line 32 and ground) of first stage 70 as shown in Fig. 10. The output, shown in line B (Fig. 11), of this first stage 70 is produced at plate 26 thereof in the manner described above in connection with Fig. 5A. This output of line B is then differentiated, the differentiated output applied to grid 88 of the inverter-amplifier tube 76 being shown in line C of Fig. 11. Grid 88 is biased positively because of its connection to line 90 through resistor 86, thereby biasing tube 76 to saturation so that the positive pulses of line C produce no resultant output from tube 76. The negative pulses, however, produce amplified positive pulses at plate 96 (line D of Fig. 11), and these, reduced in magnitude if desired by the adjustment of tap 102 of potentiometer 94, are then connected through cathode follower 78 and coupling condenser 30 to the input of second stage 72. The resultant output, taken from plate 26 of this stage, is shown in line E of Fig. 11. A similar output (not shown), of opposite polarity to the output at plate 26, is also available at collector c as described above in connection with Fig. 5A.

In one embodiment utilizing the circuit of Fig. 10, resistors 12A were 20,000 ohms, potentiometers 12B were 10,000 ohms, resistors 34 were 620 ohms, resistors 19 and 106 were 100 ohms, resistor 86 was 180,000 ohms, resistor 92 was 20,000 ohms, potentiometer 74 was 250,000 ohms, resistor 114 was 10,000 ohms, condenser 84 was 0.004 microfarad, coupling condensers 30 and 104 were 0.05 microfarad, tube 96 was a type 6SN7 and tube 78 was a type 12AU7. Line 90 was connected to a positive potential of 180 volts, line 80 was connected to a positive potential of 45 volts, line 108 was connected to a negative potential of 22.5 volts and line 82 was connected to a negative potential of 45 volts. The remainder of the circuit values were as given above in connection with Fig. 5A.

In Fig. 12 is shown another two-stage binary counter similar to that shown in Fig. 10 except that the output of first stage 70 is connected directly to the input of second stage 72 through condenser 30' which serves as a differentiating element. The operation of each stage is similar to that described above in connection with Figs. 5A and 10. However, the differentiated output of the first stage 70, as shown in line C of Fig. 11, will produce an output from the second stage 72 only in response to each positive pulse when condenser 30' is equal to 0.0109 microfarad and the remainder of the circuit parameters are as given above in connection with Fig. 5A. Thus the output from second stage 72 of Fig. 12 is similar to that shown in line E of Fig. 11 but shifted to the left or right therefrom so that the leading edge of each positive square wave portion coincides in time with each positive pulse of line C, rather than with each negative pulse as shown in line E of Fig. 11.

In Fig. 13 is shown a two-stage binary counter comprising two stages 120 and 122. Each of these stages 120, 122 is similar to the scaler circuit of Fig. 5B and each of the stages 52—58 of Fig. 8. However, in Fig. 13 the output of each stage is taken from the collector c thereof, thus utilizing the labeled "2nd output" of Fig. 5B. The operation of each stage of the counter of Fig. 13 is similar to that of the scaler circuit of Fig. 5B and hence will not be repeated here. The wave forms at the various points indicated by the capital letters in the circuit of Fig. 13 are shown in corresponding lines A—C of Fig. 14. Note again that the waveforms of each of lines B and C are somewhat peaked at the trailing edge of the positive square wave portion thereof because of the application of the positive differentiated pulse to the respective collector c at this instant.

While the circuits disclosed above have been shown using "type A" transistors with n- or p-type germanium, it is, of course, obvious that the newer type transistors, such as the co-axial, the junction type or the fieldistor may be utilized.

While there have been shown and described and pointed out the fundamental novel features of the invention as applied to preferred embodiments, it will be understood that various omissions and substitutes and changes in the form and details of the devices illustrated and in their operation may be made by those skilled in the art, without departing from the spirit of the invention. It is the intention, therefore, to be limited only as indicated by the scope of the following claims.

What is claimed is:

1. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element, connected between said emitter electrode and said load impedance element, a connection between said control element and said first impedance element, and bias means connected between the free ends of said impedance elements for biasing said emitter and collector electrodes with respectively opposite polarities relative to said base electrode; means for applying positive input pulses to the emitter electrode of the first of said serially arranged trigger circuits to produce output pulses at its base and collector electrodes and at the junction of said variable impedance and load impedance elements; and a connection between the output of each preceding trigger circuit and the emitter electrode of the successive serially arranged trigger circuit.

2. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element, connected between said emitter electrode and said load impedance element, a connection between said control element and said first impedance element, and bias means connected between the free ends of said impedance elements for biasing said emitter and collector electrodes with respectively opposite polarities relative to said base electrode; means for applying positive input pulses to the emitter electrode of the first of said serially arranged trigger circuits; and means connecting the junction of said variable impedance and load impedance element of each preceding trigger circuit to the emitter electrode of the next successive one of the serially arranged trigger circuits.

3. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element, connected between said emitter electrode and said load impedance element, a connection between said control element and said first impedance element, and bias means connected between the free ends of said impedance elements for biasing said emitter and collector electrodes with respectively opposite polarities relative to said base electrode; means for applying positive input pulses to the emitter electrode of the first of said serially arranged trigger circuits; and a differentiating circuit connecting the junction of said variable impedance and load impedance elements of each preceding trigger circuits to the emitter electrode of the next successive one of the serially arranged trigger circuits.

4. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element connected between said emitter electrode and said load impedance element, a connection between said control element and said first impedance element, and bias means connected between the free ends of said impedance elements for biasing said emitter and collector electrodes with respectively opposite polarities relative to said base electrodes; means for applying positive input pulses to the emitter electrode of the first of said serially arranged trigger circuits; a differentiating circuit for each successive trigger circuit connected to the junction of the variable impedance and load impedance elements of its respective preceding trigger circuit; an inverter-amplifier biased to saturation, for each differentiating circuit and having its input connected thereto; and a cathode follower for each inverter-amplifier and having its input connected thereto and its output connected to the emitter electrode of the next successive one of the serially arranged trigger circuits.

5. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element, connected between said emitter electrode and said load impedance element, a connection between said control element and said first impedance element, and bias means connected between the free ends of said impedance elements for biasing said emitter and collector electrodes with respectively opposite polarities relative to said base electrode; means for applying positive input pulses simultaneously to the emitter and collector electrodes of the first of said serially arranged trigger circuits; and means for connecting the junction of said variable impedance and load impedance elements of each preceding trigger circuit to the emitter electrode of the next successive one of the serially arranged trigger circuits.

6. A counter circuit in accordance with claim 5, wherein each of the two means last-mentioned includes, for each associated collector electrode and for each associated emitter electrode, a condenser and a rectifier serially connected to the respective electrode with the rectifier poled to pass only positive pulses.

7. A counter circuit comprising: a plurality of serially arranged trigger circuits, each including a semi-conductor having emitter, collector and base electrodes, first and second impedance elements respectively connected to said base and collector electrodes, a load impedance element, a variable impedance element, having a control element, connected between said emitter electrode and said load impedance element, a connection between said control element and said first impedance element, and bias means connected between the free ends of said impedance elements for biasing said emitter and collector electrodes with respectively opposite polarities relative to said base electrode; means for applying positive input pulses simultaneously to the emitter and collector electrodes of the first of said serially arranged trigger circuits; and means for connecting the collector electrode of each preceding trigger circuit to the emitter electrode of the next successive one of the serially arranged trigger circuits.

8. A counter circuit in accordance with claim 7, wherein each of the two means last mentioned includes, for each associated collector electrode and for each associated emitter electrode, a condenser and rectifier serially connnected to the respective electrode with the rectifier poled to pass only positive pulses.

9. A trigger circuit comprising: a translating device including a semi-conductor having emitter, collector and base electrodes; a fixed impedance element connected to said base electrode; a variable impedance element, having a control element, connected to said emitter electrode; a connection between said control element and said fixed impedance element; and bias means connected between the free ends of said impedance elements and said collector electrode for biasing said emitter and collector electrodes with respectively opposite polarities relative to said base electrode.

10. A trigger circuit comprising: a translating device including a semi-conductor having emitter, collector and base electrodes; an impedance element connected to said base electrode; a thermionic tube, having a control grid, connected to said emitter electrode; a connection between said control grid and a point on said impedance element; and bias means connected to said collector electrode and the free terminals of said impedance element and said tube for biasing said emitter and collector electrodes with respectively opposite polarities relative to said base electrode.

11. A trigger circuit comprising: a translating device including an n-type semi-conductor having emitter, collector and base electrodes; bias means; an impedance element connected through said bias means to said base electrode; a thermionic tube having a cathode, anode and control grid; a connection between said control grid and a point on said impedance element; a connection from said cathode to said emitter electrode; and additional bias means connected to said collector electrode, said anode and the free end of said impedance element for biasing said emitter electrode positively with respect to said base electrode and said collector electrode negatively with respect thereto.

12. A trigger circuit comprising: a translating device including an n-type semi-conductor having emitter, collector and base electrodes; an impedance element connected to said base electrode; a thermionic tube having a cathode, anode and control grid; a connection from said cathode to said emitter electrode; and bias means connected to said collector electrode, said anode, said control grid and the free end of said impedance element for biasing said emitter electrode positively with respect to said base electrode and said collector electrode negatively with respect thereto and for biasing said anode positively with respect to said cathode and said control grid negatively with respect thereto.

13. A trigger circuit comprising: a translating device including a p-type semi-conductor having emitter, collector and base electrodes; an impedance element connected to said base electrode; a thermionic tube having a cathode, anode and control grid; a connection between said control grid and a point on said impedance element; bias means connected to said collector electrode, said cathode and the free end of said impedance element for biasing said collector electrode positively with respect to said base electrode and said control grid negatively with respect to said cathode; and additional bias means connected between said anode and said emitter electrode for biasing said emitter electrode negatively with respect to said base electrode and said anode positively with respect to said cathode.

14. A trigger circuit comprising: a translating device including a p-type semi-conductor having emitter, collector and base electrodes; an impedance element connected to said base electrode; a thermionic tube having a cathode, anode and control grid; a connection between said control grid and a point on said impedance element; and bias means connected to said collector electrode, said cathode and the free end of said impedance element for biasing said collector electrode positively with respect to said base electrode and said control grid negatively with respect to said cathode.

15. A trigger circuit comprising: a translating device including an n-type semi-conductor having emitter, collector and base electrodes; bias means; an impedance element connected through said bias means to said base electrode; a thermionic tube having a cathode, anode and control grid; a connection between said control grid and a point on said impedance element; a connection from said cathode to said emitter electrode; additional bias means connected to said collector electrode, said anode and the free ends of said impedance element for biasing said emitter electrode positively with respect to said base electrode and said collector electrode negatively with respect thereto; and means for applying input pulses to said emitter electrode.

16. A trigger circuit comprising: a translating device including an n-type semi-conductor having emitter, collector and base electrodes; bias means; an impedance element connected through said bias means to said base electrode; a thermionic tube having a cathode, anode and control grid; a connection between said control grid and a point on said impedance element; a connection from said cathode to said emitter electrode; additional bias means connected to said said collector electrode, said anode and the free end of said impedance element for biasing said emitter electrode positively with respect to said base electrode and said collector electrode negatively with respect thereto; and means for applying input pulses simultaneously to said collector and emitter electrodes.

17. A trigger circuit comprising: a translating device including an n-type semi-conductor having emitter, collector and base electrodes; bias means; an impedance element connected through said bias means to said base electrode; a thermionic tube having a cathode, anode and control grid; a connection between said control grid and a point on said impedance element; a connection from said cathode to said emitter electrode; a load impedance connected to said anode, and additional bias means connected to said collector electrode and to the free ends of said load impedance and impedance element for biasing said emitter and collector electrodes with respectively opposite polarities relative to said base electrode.

18. A trigger circuit having two stable states of operation alternately assumed comprising: a translating device including a semi-conductor having a collector circuit and an emitter circuit and bias means therefor; an electron discharge device including a grid circuit and a plate circuit and bias means therefor; an impedance element common to said collector, emitter, grid and plate circuits to provide a negative impedance input characteristic for said translating device over a portion of its operating range and positive feedback in said grid and plate circuits, and means for applying trigger pulses to said devices to switch the circuit from one stable state of operation to the other.

19. A trigger circuit having two stable states of operation alternately assumed comprising: a translating device including a semi-conductor having emitter, collector and base electrodes; an impedance element; an electron discharge device having a cathode, plate and control grid; bias means connected, through said impedance, between said collector and base electrodes and, through the grid-to-cathode and plate-to-cathode paths of said electron discharge device in parallel and said impedance element, between said base and emitter electrodes, and means for applying trigger pulses to said devices to switch the circuit from one stable state of operation to the other.

20. A trigger circuit having two stable states of operation alternately assumed comprising: a translating device including a semi-conductor having a collector circuit and an emitter circuit and bias means therefor; a discharge device including a plate circuit and bias means therefor; an impedance element common to said collector, emitter and plate circuits to provide a negative impedance input characteristic for said translating device over a portion of its operating range and positive feedback in said plate circuit, and means for applying trigger pulses to said devices to switch the circuit from one stable state of operation to the other.

MARION L. WOOD.

No references cited.